(12) United States Patent
Nishiyama et al.

(10) Patent No.: US 7,161,639 B2
(45) Date of Patent: Jan. 9, 2007

(54) COORDINATE INPUT DEVICE INCLUDING A SUBSTRATE HAVING THINNER CENTRAL PORTION

(75) Inventors: Takashi Nishiyama, Fukushima-ken (JP); Takeshi Watanabe, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 83 days.

(21) Appl. No.: 10/932,962

(22) Filed: Sep. 2, 2004

(65) Prior Publication Data
US 2005/0052436 A1 Mar. 10, 2005

(30) Foreign Application Priority Data
Sep. 4, 2003 (JP) .............................. 2003-312857
May 17, 2004 (JP) .............................. 2004-146034

(51) Int. Cl.
*G02F 1/1335* (2006.01)
*G09G 5/00* (2006.01)
(52) U.S. Cl. ...................... 349/12; 345/173; 345/179
(58) Field of Classification Search ............... 345/173, 345/179, 180, 183; 349/12
See application file for complete search history.

(56) References Cited

U.S. PATENT DOCUMENTS

| 6,266,032 | B1 * | 7/2001 | Watanabe et al. .......... 345/60 |
| 6,329,044 | B1 * | 12/2001 | Inoue et al. ................. 428/209 |
| 6,559,902 | B1 * | 5/2003 | Kusuda et al. ................. 349/12 |
| 6,686,546 | B1 * | 2/2004 | Chiu ........................ 178/18.01 |
| 2003/0030626 | A1 * | 2/2003 | Matsuda et al. ............. 345/173 |
| 2003/0122792 | A1 * | 7/2003 | Yamamoto et al. ......... 345/173 |

FOREIGN PATENT DOCUMENTS

JP 10-104374 4/1998

* cited by examiner

*Primary Examiner*—Tarifur R. Chowdhury
(74) *Attorney, Agent, or Firm*—Brinks Hofer Gilson & Lione

(57) ABSTRACT

A liquid crystal display device contains a coordinate input device on the front side of a liquid crystal display unit. The coordinate input device is of a resistive contact type and includes a first light-transmitting substrate, and a second light-transmitting substrate having flexibility, which are arranged to face each other with a void space therebetween. A first light-transmitting electrode layer is formed on the inner side of the first light-transmitting substrate. A second light-transmitting electrode layer is formed on the inner side of the second light-transmitting substrate. The first light-transmitting substrate is different in thickness at its central portion and at its peripheral portion.

10 Claims, 3 Drawing Sheets

COORDINATE INPUT DEVICE INCLUDING A SUBSTRATE HAVING THINNER CENTRAL PORTION

This application claims the benefit of priority to Japanese Patent Application No. 2003-312857 filed on Sep. 4, 2003 and 2004-146034 filed on May 17, 2004, herein incorporated by reference.

BACKGROUND OF THE INVENTION

1. Field of the Invention

The present invention relates to a coordinate input device, a liquid crystal display device comprising the coordinate input device, and an electronic apparatus comprising the coordinate input device. Particularly, the present invention relates to a coordinate input device in which an operation surface can be scanned using an indicator to input coordinates, a liquid crystal display device comprising the coordinate input device, and an electronic apparatus comprising such a liquid crystal display device.

2. Description of the Related Art

Recently, as display units of electronic apparatuses such as personal digital assistants (PDA), a display unit has been known in which a transparent tablet (or a touch panel) is arranged on the front side of a liquid crystal display unit so that an operator can directly operate an object such as a menu item displayed on the display unit with his/her finger or an indicator.

FIG. 6 is a sectional view illustrating an example of a liquid crystal display device comprising such a tablet.

A liquid crystal display device 100 shown in FIG. 6 is constructed such that a tablet 130 is arranged on the front side of the liquid crystal display unit 120. In the liquid crystal display unit 120, a liquid crystal layer 123 is interposed between an upper substrate 121 and a lower substrate 122, which are arranged to face each other, and is sealed with a sealing material 124. A liquid crystal control layer 126 comprised of electrodes, alignment films and the like is formed on the inner side (the liquid crystal layer 123 side) of the upper substrate 121. On the inner side (liquid crystal layer 123 side) of the lower substrate 122, a reflecting layer 127 comprised of thin films made of a metal having high reflectance, such as aluminum or silver, and a liquid crystal control layer 128 comprised of electrodes, alignments films and the like are sequentially laminated on the lower substrate 122.

In the tablet 130, transparent upper and lower substrates 131 and 132, which are arranged to face each other), are integrally bonded to each other with a sealing material 136 (refer to, for example, Japanese Unexamined Patent Application Publication No. 10-104374). The upper substrate 131 is made of a flexible material, such as a transparent film, having a thickness of about 0.1 mm to about 0.2 mm. The lower substrate 132 comprises a plastic substrate having a thickness of about 0.5 mm to about 1.5 mm.

A first transparent electrode layer 133 is formed on the inner side (on the side of the upper substrate 131) of the lower substrate 132, and spacers (not shown) made of an insulating material are formed on the first transparent electrode layer 133 so as to be spaced from each other. A second transparent electrode layer 134 is formed on the inner side (on the side of the lower substrate 132) of the upper substrate 131.

A lower printed circuit (not shown) is formed at a peripheral portion of the lower substrate 132 on the inner side thereof, and the first transparent electrode layer 133 is connected to the lower printed circuit. An upper printed circuit (not shown) is formed at a peripheral portion of the upper substrate 131 on the inner side thereof, and the second transparent electrode layer 134 is connected to the upper printed circuit.

In such a tablet 130, since the upper substrate 131 is formed of a transparent film, the upper and lower printed circuits may be see-through. Thus, a frame 145 called a bezel is provided at the peripheral portion of the upper substrate 131 on the outer side thereof so that the printed circuits cannot be seen.

The tablet 130 having the above construction is of a resistive contact type. The upper substrate 131 is pressed with the indicator 140 so as to flex the first and second electrode layers 133 and 134, which are spaced from each other by the spacers when the tablet 130 is not operated. Then, the first and second electrode layers 133 and 134 are brought into electrical contact with each other so that coordinates can be input. Further, the tablet 130 is fixed to the liquid crystal display unit 120 via supporting members 139, and in the state in which the tablet 130 is fixed, the tablet 130 and the liquid crystal display unit 120 are spaced from each other with a predetermined gap therebetween.

According to the liquid crystal display device 100 of the above-described construction, display can be performed using the liquid crystal display unit 120, and an operation surface (the surface of the upper substrate 131) of the tablet 130 is scanned by the indicator 140 (a pen-type indicator in the drawing), so that coordinates can be input. Accordingly, when an operation is performed to select, for example, an object such as a menu item displayed on the liquid crystal display unit 120, the selecting operation can be performed by pressing a part of the display unit where the object is displayed, using the indicator 140.

However, in the liquid crystal display device 100 having the above construction, the upper substrate 131 of the tablet 130 is pressed and flexed by the indicator 140 at the time of input of coordinates. At this time, a pressing force is also applied to the liquid crystal display unit 120 arranged below the tablet 130, which may flex the upper substrate 121, changes a gap (cell gap) between the upper and lower substrates, and causes fluctuation in a display image. As a result, a problem may occur that it is hard for an operator to see the display image. Since the cell gap of the liquid crystal display unit 120 closely matches several micrometers, the cell gap of the liquid crystal display unit 120 changes locally in a large ratio although the upper substrate 121 is just slightly flexed. As a result, display may fluctuate and the visibility of display may deteriorate.

In addition, another example of the conventional tablet includes a tablet having the same structure as the tablet shown in FIG. 6 except that the lower substrate 132 comprising a plastic substrate is replaced with a lower substrate in which the underside of a transparent film (on the side of the liquid crystal display unit) having a thickness of about 0.05 mm to about 0.2 mm is adhered to the upside of a plastic substrate having a thickness of about 0.4 mm to about 2.0 mm. Even in the tablet of such structure, however, the same problem as in the above tablet may occur.

Accordingly, the spatial distance between the lower substrate of the tablet and the liquid crystal display device is generally set to about 0.3 mm to about 0.6 mm. However, the demand for tablets having a small flexure in the limited space increases.

SUMMARY OF THE INVENTION

The present invention has been made in consideration of the above situations. It is therefore an object of the present invention to provide a coordinate input device capable of preventing the cell gap of a liquid crystal display device provided below a coordinate input device from changing due to a pressing force caused by pressing an indicator at the time of input of coordinates.

It is another object of the present invention to provide a liquid crystal display device, comprising the above-mentioned coordinate input device, capable of preventing a display image from fluctuating without affecting the cell gap of the liquid crystal display device even if a pressing force is applied to the coordinate input device by the pressing of an indicator at the time of input of coordinates.

It is still another object of the present invention to provide an electronic apparatus having an excellent visibility of display by comprising the above-mentioned liquid crystal display device.

In order to solve the above problems, the present inventors performed studies and experiments zealously. As a result, in the case that the lower substrate has a uniform thickness as in the conventional tablets, when an operator presses the external surface of an upper substrate using an indicator at the time of input of coordinates, the peripheral portion of the substrate is hardly flexed because it is close to a portion of the lower substrate to which a sealing material is adhered (a portion of the lower substrate held by a sealing material), whereas the central portion of the lower substrate is easily flexed because it is located away from the sealing material. Accordingly, it was found that the deflection of the central portion of the lower substrate increases, and the deflection of the central portion of the upper substrate of the liquid crystal display unit arranged below the tablet increases, which may result in a change in the cell gap.

Therefore, the present inventors have found the following facts and have completed the present invention. That is, if the thickness of the central portion of the lower substrate that is away from a portion of the lower substrate to which a sealing material is adhered is made smaller than the peripheral portion of the lower substrate, and the central portion of the lower substrate is constructed so as to be hardly flexed by forming the external surface of the lower substrate into a concave curved surface, the upper substrate of the liquid crystal display unit is hardly affected by the flexure. Even if the central portion of the lower substrate is flexed, since a concave portion exists (the distance between the central portion of the lower substrate and the upper substrate of the liquid crystal display unit is large), the upper substrate of the liquid crystal display unit is hardly affected by the flexure.

The present invention has employed the following construction to accomplish the above objects.

The coordinate input device of the present invention comprises a first light-transmitting substrate, and a second light-transmitting substrate having flexibility, which are arranged to face each other with a void space therebetween, a first light-transmitting electrode layer being formed on the inner side of the first light-transmitting substrate, a second light-transmitting electrode layer being formed on the inner side of the second light-transmitting substrate, and, when the external surface of the second light-transmitting substrate is pressed by an indicator, the first light-transmitting electrode layer and the second light-transmitting electrode layer are partially and electrically connected to each other in the pressed portion so as to output coordinate information of the pressed portion, wherein the first light-transmitting substrate is different in thickness at its central portion and at its peripheral portion.

According to the coordinate input device of the first invention, since the first light-transmitting substrate is different in thickness at its central portion and at its peripheral portion, when the external surface of the second light-transmitting substrate is pressed by an indicator at the time of input of coordinates, the deflection of the central portion of the first light-transmitting substrate by a pressing force from the indicator can be decreased. Since the distance between the central portion of the first light-transmitting substrate and the upper substrate of the liquid crystal display unit arranged below the first light-transmitting substrate increases, even if the central portion of the first light-transmitting substrate is flexed, the upper substrate of the liquid crystal display unit can be prevented from being affected by the flexure.

Accordingly, according to the coordinate input device of the first invention, even if the external surface of the second light-transmitting substrate is pressed by the indicator at the time of input of coordinates, the upper substrate of the liquid crystal display unit arranged below the first light-transmitting substrate of the coordinate input device can be prevented from being flexed by the pressing force, so that the cell gap can be prevented from changing.

In the coordinate input device of the first invention, preferably, the first light-transmitting substrate is formed so that the thickness thereof gradually decreases from the peripheral portion to the central portion, and the external surface of the first light-transmitting substrate is formed into a concave curved surface.

In the coordinate input device of the above construction, the thickness of the central portion of the first light-transmitting substrate which is located away from a portion of the first light-transmitting substrate held by a sealing material is made smaller than the thickness of the peripheral portion thereof, and the external surface of the first light-transmitting substrate is formed into a concave curved surface. Thus, when the external surface of the second light-transmitting substrate is pressed by the indicator at the time of input of coordinates, the central portion of the first light-transmitting substrate is constructed so as to hardly flex. Even if the central portion of the second light-transmitting substrate is flexed, since concave portion exists (the distance between the central portion of the first light-transmitting substrate and the upper substrate of the liquid crystal display unit is large), the upper substrate of the liquid crystal display unit is hardly affected by the flexure, so that a cell gap can be prevented from changing.

In the tablet (coordinate input device) of the present invention in which the external surface of the lower substrate (first light-transmitting substrate) is formed into a concave curved surface, the deflection of the tablet when the same load is applied thereto is about 0.3 times to about 0.97 times, as compared with the conventional tablet having uniform thickness, which prevents the tablet from being liable to bump against the liquid crystal display unit.

For example, as the lower substrate (first light-transmitting substrate), supposing that a lower substrate having a thickness of 1.0 mm using a flat plastic plate (whose bending elastic modulus is 2600 MPa) of 60 mm×45 mm, and a lower substrate in which the external surface of a plastic plate of 60 mm×45 mm is formed into a concave curved surface, the thickness of a central portion thereof is 1.0 mm, and the thickness of a peripheral portion thereof is 1.3 mm are used. In this case, when a load of 4.9 N (500 gf) is applied to each of the lower substrates, the flat lower substrate is flexed by 0.2 mm, whereas the lower substrate whose external surface is formed into a concave curved surface is flexed by 0.14 mm, so that the deflection can be decreased by 30%.

Further, in the coordinate input device of the first invention, a rib may be formed at the peripheral portion of the first light-transmitting substrate.

Preferably, the height of the rib is designed such that the underside (external surface) of the first light-transmitting layer except for the peripheral portion thereof, and the liquid crystal display unit arranged below (outside) the first light-transmitting substrate are spaced from each other with a predetermined gap therebetween. Specifically, the first light-transmitting substrate is designed such that the peripheral portion thereof is formed with the rib is closest to the liquid crystal display unit, and the remaining portion thereof is spaced from the liquid crystal display unit with a predetermined gap. Further, the cell gap of the liquid crystal display unit is less affected at the time of input of coordinates. Thus, the first light-transmitting substrate is formed such that the thickness thereof gradually decreases from the peripheral portion to the central portion, the external surface thereof is formed into a concave curved surface, and the peripheral portion thereof is formed with the rib. As described above, when the underside (the external surface) of the first light-transmitting substrate except for the peripheral portion thereof and the liquid crystal display unit has a predetermined gap, a tablet (a coordinate input device) can be formed such that the first light-transmitting substrate with rib comes in direct contact with the liquid crystal display unit. As a result, supporting members are not required and the number of parts can be reduced.

A liquid crystal display device of the second invention comprises the coordinate input device of the present invention according to any one of the above constructions on the front side of a liquid crystal display unit.

According to the liquid crystal display device of the second invention having the above construction, even if a pressing force caused by pressing the indicator at the time of input of coordinates is applied to the second light-transmitting substrate of the coordinate input device, the cell gap of the liquid crystal display unit is not affected, and fluctuation occurs in a display image, so that the visibility of display can be improved.

An electronic apparatus of the third invention comprises the liquid crystal display device of the second invention in a display unit.

In the electronic apparatus of the third invention, the display unit is provided with the liquid crystal display device capable of preventing a change in the cell gap of the liquid crystal display device due to a pressing force applied to the coordinate input device by pressing an indicator at the time of input of coordinates. As a result, an electronic apparatus having an excellent visibility of display can be realized.

As described above in detail, according to the present invention, it is possible to provide a coordinate input device capable of preventing the cell gap of a liquid crystal display device provided below a coordinate input device from changing due to a pressing force caused by pressing an indicator at the time of input of coordinates.

Further, according to the liquid crystal display device of the present invention, even if a pressing force caused by pressing the indicator at the time of input of coordinates is applied to the coordinates input device, the cell gap of the liquid crystal display unit are not affected by the pressing force, and a display image can be prevented from fluctuating.

According to the electronic apparatus, it is possible to provide an electronic apparatus having an excellent visibility of display by comprising the liquid crystal display device of the present invention.

DESCRIPTION OF THE PREFERRED EMBODIMENT

Embodiments of the present invention will now be described with reference to the drawings. In all the following drawings, scales of the film thickness or dimensions of respective elements are made appropriately different from each other in order to easily see the drawings.

(First Embodiment of Coordinate Input Device and Liquid Crystal Display Device)

Figure 1:
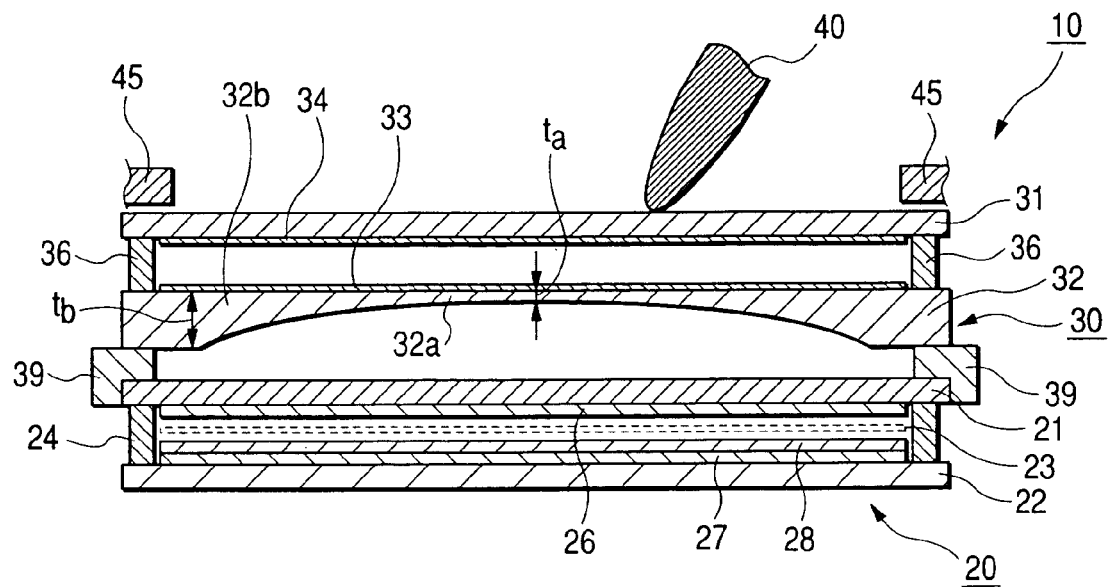
FIG. 1 is a schematic sectional view illustrating an embodiment of a liquid crystal display device comprising a coordinate input device according to the present invention.

FIG. 1 is a schematic sectional view of a liquid crystal display device that is one embodiment of the present invention.

The liquid crystal display device 10 comprises a liquid crystal display unit 20, and a touch panel (a coordinate input device) 30 that is one embodiment of the present invention arranged on the front side thereof.

In the liquid crystal display unit 20, a liquid crystal layer 23 is interposed between an upper substrate 21 and a lower substrate 22, which are arranged to face each other, and is sealed with a sealing material 24. A liquid crystal control layer 26 comprised of electrodes, alignment films and the like is formed on the inner side (on the side of the liquid crystal layer 23) of the upper substrate 21. On the inner side (on the side of the liquid crystal layer 23) of the lower substrate 22, a reflecting layer 27 comprised of thin films made of a metal having high reflectance, such as aluminum or silver, and a liquid crystal control layer 28 comprised of electrodes, alignment films and the like are sequentially laminated on the lower substrate 22.

The liquid crystal display unit 20 is of a reflective type that performs display by reflecting the external light incident from the outside by the reflecting layer 27. The reflecting layer 27 will be described below with reference to FIG. 2.

Figure 2:
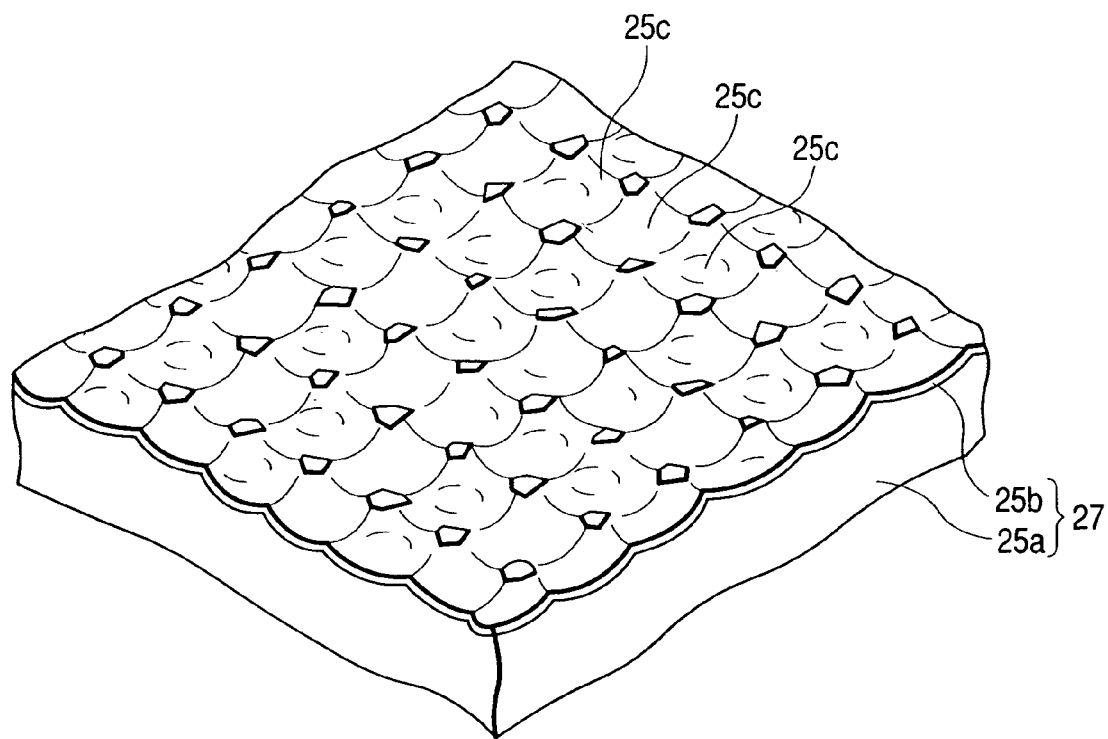
FIG. 2 is a partially enlarged perspective view of a reflecting layer of a liquid crystal display unit included in the liquid crystal display device illustrated in FIG. 1.

FIG. 2 is a partially enlarged perspective view of the reflecting layer 27. The reflecting layer 27 includes an organic film 25a made of an acrylic resin or the like and having unevenness formed on the surface thereof, and a reflecting film 25b comprised of thin films made of a metal having high reflectance, such as aluminum and silver, which is layered on the organic film 25*a* by a sputtering method or the like. Moreover, a planarizing film may be formed of a silicon-based resin or the like on the reflecting film 25*b* to planarize the unevenness on the surface thereof.

As a shape of each of concave portions 25*c* on the surface of the reflecting film 25*b*, a shape of a smooth curved surface, such as a spherical surface, or a shape in which the curved surface is combined with a planar surface, can be employed. The angle of inclination of the inner surface of each of the concave portions or the pitch and depth of the concave portions is/are adjusted so that a reflecting layer can be formed to have an appropriate reflecting property in conformity with the design of an electronic apparatus comprising a liquid crystal display device as a display unit.

As described above, the liquid crystal display unit 20 comprises the reflecting layer 27 having the surface shape shown in FIG. 2, so that incident light can be efficiently reflected and a higher brightness of display can be performed. Further, when the incident light is external light, specular reflection of light is prevented, so that the display can be obtained which is bright and excellent in visibility.

In the touch panel 30, an upper light-transmitting substrate (a second light-transmitting substrate) 31 and a lower light-transmitting substrate (a first light-transmitting substrate) 32 are arranged to face each other and are integrally bonded to each other with a substantially annular sealing material 36, and a spatial portion is defined between the upper light-transmitting substrate 31 and the lower light-transmitting substrate 32.

The upper light-transmitting substrate 31 is made of a flexible material, such as a transparent film, having a thickness of about 0.1 mm to about 0.2 mm.

The lower light-transmitting substrate 32 is comprised of a transparent glass substrate or a plastic substrate. The lower light-transmitting substrate 32 is different in thickness at its central portion 32*a* at a position remote from a portion of the substrate 32 held with the sealing material 36 and at a peripheral portion (an end) 32*b* at a position close to the portion of the substrate 32 held with the sealing material 36. Specifically, the thickness ta of the central portion 32*a* at a position remote from a portion of the substrate 32 held with the sealing material 36 is smaller than the thickness tb of the peripheral portion 32*b* at a position close to the portion of the substrate 32 held with the sealing material 36. More specifically, the internal surface (on the side of the upper light-transmitting substrate) of the substrate 32 is formed into a flat surface, and, the external surface (on the side of the liquid crystal display unit) of the substrate 32 is formed into a concave curved surface, so that the thickness of the substrate 32 gradually decreases from the peripheral portion 32*b* to the central portion 32*a*.

It is preferable that the thickness ta of the central portion 32*a* is about 0.5 times to about 0.99 times the thickness tb of the peripheral portion 32*b*. When the thickness tb of the peripheral portion 32*b* is, for example, 1.3 mm, the thickness ta of the central portion 32*a* is about 1.0 mm.

As described above, the lower light-transmitting substrate 32 has the flat internal surface. Thus, when the upper light-transmitting substrate 31, which is arranged to face the lower light-transmitting substrate 32, is not operated (when it is not pressed by an indicator 40), it employs a substrate whose internal and external surfaces are all flat.

A first light-transmitting electrode layer 33 is formed on the inner side (on the side of the upper light-transmitting substrate 31) of the lower light-transmitting substrate 32, and spacers (not shown) made of an insulating material are formed on the first light-transmitting electrode layer 33 so as to be spaced from each other.

A lead-out circuit made of a conductive metal such as silver and a lower printed circuit (not shown) such as a connecting electrode portion connected to the lead-out circuit are formed at the peripheral portion of the lower light-transmitting substrate 32 on the inner side thereof. The first light-transmitting electrode layer 33 is connected to the lower printed circuit.

A second light-transmitting electrode layer 33 is formed on the inner side (on the side of the lower light-transmitting substrate 32) of the upper light-transmitting substrate 31.

Both of these first and second light-transmitting electrode layers 33 and 34 are formed of a transparent conductive material such as indium tin oxide (ITO).

Further, an upper printed circuit such as a connecting electrode portion made of a conductive metal such as silver (not shown) is formed at a peripheral portion of the upper light-transmitting substrate 31 on the inner side thereof. The second light-transmitting electrode layer 34 is connected to the upper printed circuit.

In the touch panel 30, since the upper light-transmitting substrate 31 is formed of a transparent film, the upper and lower printed circuits may be see-through. Thus, a frame 45 called a bezel is provided at the peripheral portion of the light-transmitting substrate 31 on the outer side thereof, so that the printed circuits cannot be seen.

Further, the touch panel 30 is fixed to the liquid crystal display unit 20 via supporting members 39, and in the state in which the touch panel 30 is fixed, the touch panel 30 and the liquid crystal display unit 20 are spaced from each other with a predetermined gap therebetween.

The touch panel 30 having the above construction is of a resistive contact type. The upper light-transmitting substrate 31 is pressed with the indicator 40 so as to flex the first and second light-transmitting electrode layers 33 and 34, which are spaced from each other by the spacers when the touch panel 30 is not operated. Then, the first and second light-transmitting electrode layers 33 and 34 are brought into electrical contact with each other so that coordinates can be input.

According to the liquid crystal display device 10 of the above-described construction, display can be performed using the liquid crystal display unit 20, and an operation surface (the surface of the upper light-transmitting substrate 31) of the touch panel 30 is scanned by the indicator 40 (a pen-type indicator in the drawings), so that coordinates can be input. Accordingly, when an operation is performed to select, for example, an object such as a menu item displayed on the liquid crystal display unit 20, the selecting operation can be performed by pressing a part of the display unit where the object is displayed, using the indicator 40.

In the touch panel 30 of the above construction, the thickness ta of the central portion 32*a* of the lower light-transmitting substrate 32 is made smaller than the thickness tb of the peripheral portion 32*b* thereof, and the external surface of the lower light-transmitting substrate 32 is formed into a concave curved surface (in other words, a concave portion is formed in the external surface of the lower light-transmitting substrate). Thus, when the external surface of the upper light-transmitting substrate 31 is pressed by the indicator 40 at the time of input of coordinates, the central portion 32*a* of the lower light-transmitting substrate 32 is constructed so as to hardly flex. Even if the central portion 32*a* is flexed, the concave portion exists (the distance between the central portion 32*a* of the lower light-transmitting substrate 32 and the upper substrate 21 of the liquid crystal display unit 20 is large). Thus, the upper substrate 21 of the liquid crystal display unit 20 is hardly affected by the flexure, so that the cell gap can be prevented from changing.

According to the liquid crystal display device 10 of the present embodiment, the touch panel 30 having the above construction is provided on the front side of the liquid crystal display unit 20. Thus, even if a pressing force caused by pressing the indicator 40 at the time of input of coordinates is applied to the upper light-transmitting substrate 31 of the touch panel 30, the cell gap of the liquid crystal display unit 20 is not affected, and fluctuation does not occur in an display image, so that the visibility of display can be improved.

In addition, in the liquid crystal display device of the above embodiment, the touch panel 30 as shown in FIG. 1 is provided on the front side of the liquid crystal display unit 20. However, a touch panel 30a as shown in FIG. 3 may be provided on the front side of the liquid crystal display unit 20, or a touch panel 30b as shown in FIG. 4 may be provided on the front side of the liquid crystal display unit 20.

Figure 3:
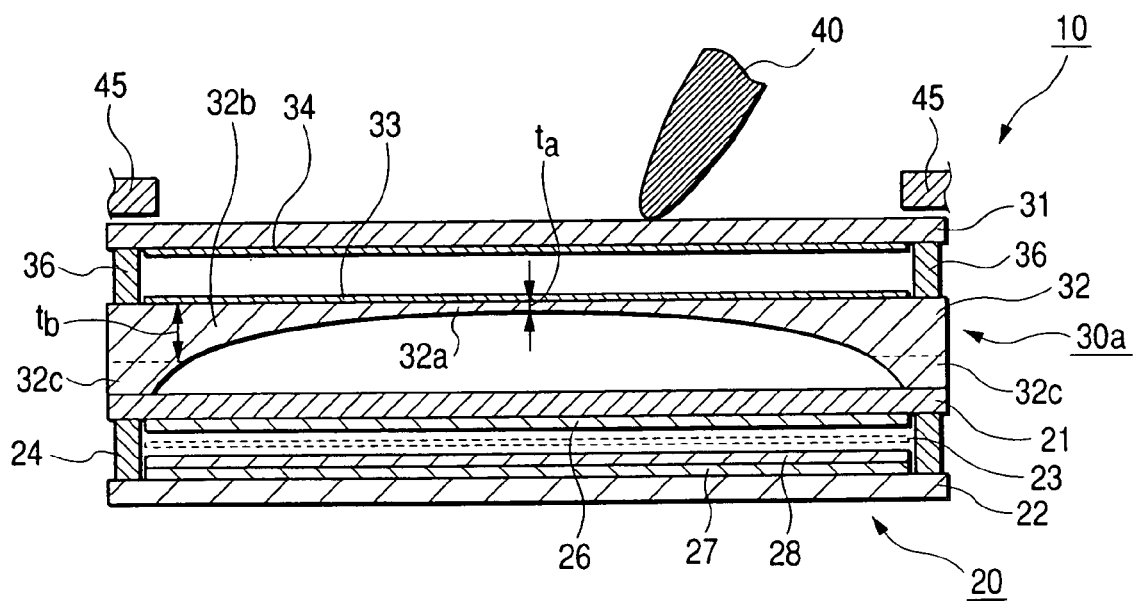
FIG. 3 is a schematic sectional view illustrating an embodiment of a liquid crystal display device comprising another coordinate input device according to the present invention.

The touch panel 30a of FIG. 3 is particularly different from the touch panel 30 of FIG. 1 in that a rib 32c is formed at the peripheral portion of the lower light-transmitting substrate 32, made of plastic, on the outer side thereof. The rib 32c is integrally formed with the lower light-transmitting substrate 32.

Preferably, the height of the rib 32c is designed such that the underside (external surface) of the lower light-transmitting layer 32 except for the peripheral portion thereof, and the liquid crystal display unit 20 arranged below (outside) the lower light-transmitting substrate 32 are spaced from each other with a predetermined gap therebetween. Specifically, the lower light-transmitting substrate 32 is designed such that the peripheral portion thereof formed with the rib 32c is closest to the liquid crystal display unit 20, and the remaining portion thereof is spaced from the liquid crystal display unit 20 with a predetermined gap therebetween. Further, the cell gap of the liquid crystal display unit 20 is less affected at the time of input of coordinates. Thus, the lower light-transmitting substrate 32 is formed such that the thickness thereof gradually decreases from the peripheral portion 32b to the central portion 32a, the external surface thereof is formed into a concave curved surface, and the peripheral portion 32b thereof is formed with the rib 32c. As described above, when the underside (the external surface) of the lower light-transmitting substrate 32 except for the peripheral portion thereof and the liquid crystal display unit 20 has a predetermined gap, a tablet (a coordinate input device) can be formed such that the first light-transmitting substrate 32 with a rib comes in direct contact with the liquid crystal display unit 20. Thus, it is not necessary to provide the supporting members 39 as shown in FIG. 1 and it is possible to reduce the number of parts.

Figure 4:
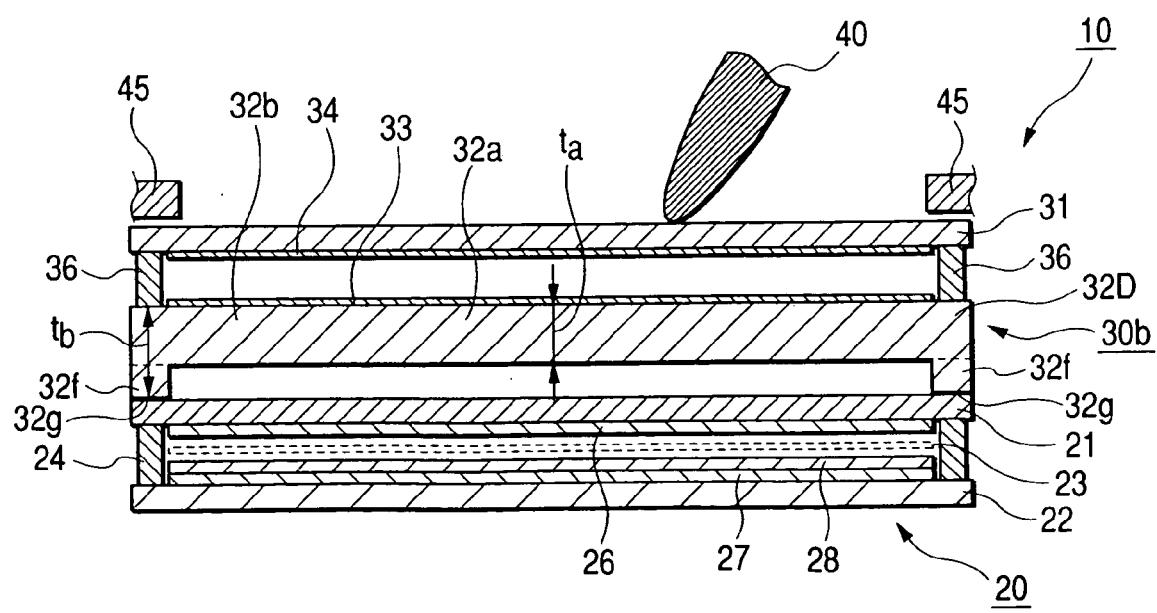
FIG. 4 is a schematic sectional view illustrating an embodiment of a liquid crystal display device comprising another coordinate input device according to the present invention.

The touch panel 30b in FIG. 4 is particularly different from the touch panel 30 in FIG. 1 in that the external surface (on the side of the liquid crystal display unit) of a central portion 32a of a lower light-transmitting substrate 32D made of plastic is formed into a flat surface, and a protrusion comprised of a rib 32f is formed at a peripheral portion 32b of the lower light-transmitting substrate 32D on the outer side thereof. The rib 32f is frame-shaped in plan view as seen from the bottom (the liquid crystal display unit 20 side). Since the rib 32f is provided with the peripheral portion of the lower light-transmitting substrate 32D on the outer side thereof, both ends of the lower light-transmitting substrate 32D on the outer side thereof is stepped in sectional view. The rib 32f is integrally formed with lower light-transmitting substrate 32D.

In the touch panel 30b, as described above, the rib 32f is integrally formed at the peripheral portion of the lower light-transmitting substrate 32D. Thus, the thickness ta of the central portion 32a of the lower light-transmitting substrate 32D is made smaller than the thickness tb of the peripheral portion 32b.

Preferably, the height of the rib 32f is designed such that the underside (external surface) of the lower light-transmitting layer 32D, and the liquid crystal display unit 20 arranged below (outside) the lower light-transmitting substrate 32D are spaced from each other with a predetermined gap therebetween. Specifically, the lower light-transmitting substrate 32D is designed such that a portion thereof formed with the rib 32f is closest to the liquid crystal display unit 20, and the remaining portion thereof is spaced from the liquid crystal display unit 20 with a predetermined gap. As an examples of dimensions of the rib 32f, the width is set to about 0.5 mm to about 3 mm, and the height is set to about 10 μm to about 1 mm. Specifically, the gap between the central underside of the lower light-transmitting substrate 32D and the liquid crystal display unit 20 is, for example, about 10 μm to about 1 mm, preferably, about 0.3 mm to about 0.7 mm.

When the touch panel 30b having the above construction is laminated on the liquid crystal display unit 20, an inexpensive and thin double sided adhesive tape 32g is interposed between the rib 32f of the lower light-transmitting substrate 32D and the liquid crystal display unit 20 to adhere them to each other. As a result, a desired liquid crystal display device can be obtained. The thickness of the double sided adhesive tape 32g may be about 10 μm to about 75 μm.

The touch panel 30b is constructed such that the rib 32f is formed at the peripheral portion of the lower light-transmitting substrate 32D on the outer side thereof and the thin double sided adhesive tape 32g is interposed between the rib 32f and the liquid crystal display unit 20. As a result, the central underside of the lower light-transmitting substrate 32D and the liquid crystal display unit 20 are laminated so as to be spaced from each other with a predetermined gap therebetween. Accordingly, a liquid crystal display device comprising such a touch panel 30b can be manufactured at low cost.

In addition, when the rib 32f is not formed at the peripheral portion of the lower light-transmitting substrate 32D on the outer side thereof (when the entire external surface of the lower light-transmitting substrate is flat), it is necessary to interpose a thick double sided adhesive tape between the peripheral portion of the lower light-transmitting substrate 32D on the outer side thereof and the liquid crystal display unit 20 so that a predetermined gap can be formed between the central underside of the lower light-transmitting substrate 32D and the liquid crystal display unit 20. Since such a thick double sided adhesive tape costs higher as compared to the thin double sided adhesive tape, the cost of a liquid crystal display device may increase.

The present invention is not limited to the above-described embodiments, and the present invention can be modified in various ways without departing from the sprit of the present invention.

In the embodiments shown in FIGS. 1 to 3, each of the touch panels comprises the lower light-transmitting substrate (the first light-transmitting substrate) that is formed such that the thickness of the substrate decreases from the peripheral portion to the central portion. However, the first light-transmitting substrate may be formed such that the thickness thereof gradually increases from the peripheral portion to the central portion, and the internal surface thereof is formed into a convex curved surface. Otherwise, the first light-transmitting substrate may be formed such that the thickness of the peripheral portion thereof is smaller than the thickness of the central portion thereof, and the inner central portion thereof is swollen toward the upper light-transmitting substrate (the second light-transmitting substrate) and the external central portion thereof protrude outward. The above-described effects of the present invention can also be obtained by these first light-transmitting substrates.

In the embodiments shown in FIGS. 1 to 4, the coordinate input device of the present invention is applied to a touch panel of a resistive contact type. However, the coordinate input device can also be applied to an electrostatic capacitive touch.

In the embodiments shown in FIGS. 1 to 4, the liquid crystal display device of the present invention is applied to a reflective liquid crystal display device. However, the liquid crystal display device can also be applied to a transflective liquid crystal display device. In that case, the reflecting layer is replaced with a transflective layer in which through holes are formed in a metallic thin film and a backlight (an illumination device) is provided on the backside of the liquid crystal display unit.

(Embodiment of Electronic Apparatus)

Figure 5:
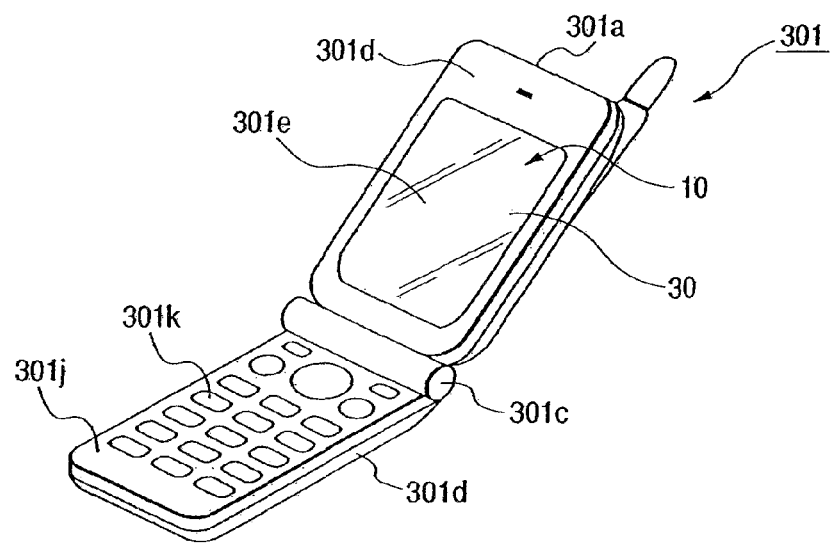
FIG. 5 is a perspective view illustrating an example of an electronic apparatus comprising the liquid crystal display device according to the present invention.
Figure 6:
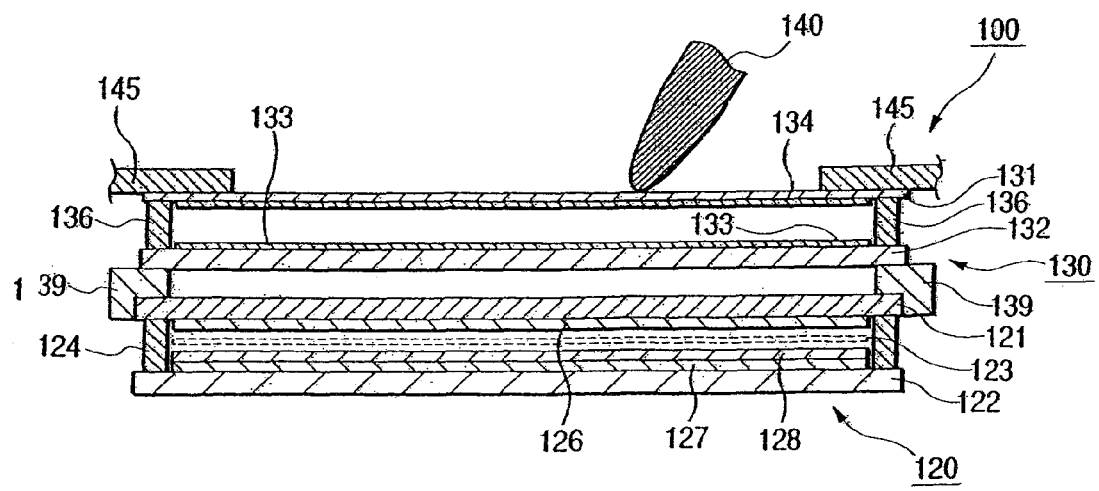
FIG. 6 is a sectional view illustrating an example of a liquid crystal display device comprising a conventional tablet.

FIG. 5 is a perspective view illustrating an example of a mobile telephone (an electronic apparatus) comprising a liquid crystal display device of the previous embodiments according to the present invention.

In a mobile telephone 301 shown in FIG. 5, an upper casing 301a is expandably connected to a lower casing 301b by a hinge 301c, and a display unit 301e is provided on an operation surface 301d of the upper casing 301a. The display unit 301e is provided with the liquid crystal display device 10 of the previous embodiments while the touch panel 30 is directed upward. In addition, an operation surface 301j of the lower casing 301b is provided with an input keyboard 301k for performing dialing operation.

In the mobile telephone 301 of the present embodiment, it is advantageous in that the visibility of display can be improved because the display unit 301e comprises the liquid crystal display device 10 of the previous embodiments.

What is claimed is:

1. A coordinate input device comprising: a first light-transmitting substrate, and a second light-transmitting substrate having flexibility, which are arranged to face each other with a void space therebetween,
   a first light-transmitting electrode layer formed on a inner side of the first light-transmitting substrate, a second light-transmitting electrode layer formed on an inner side of the second light-transmitting substrate, and
   when an external surface of the second light-transmitting substrate is pressed by an indicator, the first light-transmitting electrode layer and the second light-transmitting electrode layer are partially and electrically connected to each other in a pressed portion so as to output coordinate information of the pressed portion,
   wherein the external surface of the first light-transmitting substrate is different in thickness at a central portion and at a peripheral portion, and
   wherein the thickness of the central portion of the first light-transmitting substrate is smaller than the thickness of the peripheral portion.

2. The coordinate input device according to claim 1, wherein the first light-transmitting substrate is plastic.

3. The coordinate input device according to claim 1, wherein the first light-transmitting substrate is formed so that the thickness thereof gradually decreases from the peripheral portion to the central portion, and the external surface of the first light-transmitting substrate is formed into a concave curved surface.

4. The coordinate input device according to claim 3, wherein the thickness of the central portion of the first light-transmitting substrate is about 0.5 times to about 0.99 times the thickness of the peripheral portion of the first light-transmitting substrate.

5. The coordinate input device according to claim 1, wherein a rib is formed at the peripheral portion of the first light-transmitting substrate.

6. The coordinate input device according to claim 5, wherein the first light-transmitting substrate and the rib are made of plastic, and the first light-transmitting substrate and the rib are integrally formed with each other.

7. A liquid crystal display device comprising the coordinate input device according to claim 5 on the front side of a liquid crystal display unit,
   wherein the rib integrally formed with the first light-transmitting substrate is arranged so as to be brought into direct contact with the liquid crystal display unit.

8. An electronic apparatus comprising the liquid crystal display device according to claim 7 in a display unit.

9. A liquid crystal display device comprising the coordinate input device according to claim 1 on the front side of a liquid crystal display unit.

10. An electronic apparatus comprising the liquid crystal display device according to claim 9 in a display unit.

* * * * *